United States Patent [19]
Asai

[11] Patent Number: 6,018,128
[45] Date of Patent: Jan. 25, 2000

[54] COMBINATION WEIGHING APPARATUS WITH RELIABLE COMBINATION CALCULATION

[75] Inventor: Yoshiharu Asai, Shiga, Japan

[73] Assignee: Ishida Co., Ltd., Kyoto, Japan

[21] Appl. No.: 09/121,919

[22] Filed: Jul. 24, 1998

[30] Foreign Application Priority Data

Jul. 25, 1997 [JP] Japan ................................. 9-199873

[51] Int. Cl.[7] .......................... G01G 23/38; G01G 13/00
[52] U.S. Cl. ...................... 177/4; 177/5; 177/6; 177/10; 177/25.18
[58] Field of Search ................... 177/2, 3, 4, 5, 177/6, 7, 8, 9, 10, 11, 12, 13, 25.18, 103

[56] References Cited

U.S. PATENT DOCUMENTS

| | | | |
|---|---|---|---|
| 4,229,794 | 10/1980 | Foster | 177/25.18 |
| 4,239,434 | 12/1980 | Gannon | 177/4 |
| 4,398,253 | 8/1983 | Karp et al. | 177/4 |
| 4,415,048 | 11/1983 | Teraoka | 177/5 |
| 4,442,910 | 4/1984 | Mikami | 177/25.18 |
| 4,487,277 | 12/1984 | Morita et al. | 177/25.18 |
| 4,821,820 | 4/1989 | Edwards et al. | 177/25.18 |
| 4,838,368 | 6/1989 | Sato et al. | 177/25.18 |
| 5,086,855 | 2/1992 | Tolson | 177/5 |
| 5,319,160 | 6/1994 | Nambu | 177/25.18 |
| 5,596,179 | 1/1997 | Sakaeda | 177/25.18 |

FOREIGN PATENT DOCUMENTS

| | | |
|---|---|---|
| 0063042 | 10/1982 | European Pat. Off. . |
| 0319225 | 6/1989 | European Pat. Off. . |
| 2636426 | 3/1990 | France . |

*Primary Examiner*—Randy W. Gibson
*Attorney, Agent, or Firm*—Loeb & Loeb, LLP

[57] ABSTRACT

A combination weighing apparatus for performing a combination weighing of a plurality of articles to be weighed includes a plurality of containers Tb each bearing an information storage medium 1 on or from which product information including a weight value of the article to be weighed M2 is recorded or read-out, respectively, a write-in device 15 for writing the product information in the information storage medium 1, a read-out device 16 for reading the product information from the information storage medium 1, and a calculating device 4 for combining respective weight values of the articles to be weighed M2 which have been read out and for selecting a combination having a weight equal or approximating to a target value within a predetermined weight allowance. This combination weighing apparatus is effective to accomplish an easy and accurate combination calculation even though the order of transport of the articles to be weighed M2 changes.

19 Claims, 2 Drawing Sheets

COMBINATION WEIGHING APPARATUS
WITH RELIABLE COMBINATION
CALCULATION

BACKGROUND OF THE INVENTION

1. Field of the Invention

The present invention relates to a combination weighing apparatus for weighing a plurality of articles to be weighed so that a product of a predetermined weight can eventually be obtained.

2. Description of the Prior Art

Articles such as a cooked food "tsukuda-ni" or "sigure-ni" boiled down in soy that are available in supermarkets are generally sold as packed in a package containing a predetermined weight of the article. As an apparatus for dispensing the articles into packages each containing the weighed article, a combination weighing apparatus has hitherto been known in which container or trays each accommodating materials prepared in a small amount (article to be weighed) are weighed by a weighing machine while being successively transported past a weighing station towards a collecting station by means of a transport conveyor system and are, after having been weighed and then transported to the collecting station, subjected to a combination calculation by means of a combination calculating means to select a combination of the materials of a weight equal or approximate to a target weight within a predetermined weight allowance, and in which only the containers or trays which have accommodated the successively selected combinations of the materials are subsequently discharged and recovered from the transport conveyor system.

In such case, respective weights of the articles to be weighed, which have been weighed by the weighing machine, are successively transported to the combination weighing apparatus for combination calculation in the order in which the articles to be weighed have been placed on the transport conveyor system, and the combinations of the articles are then selected and discharged.

In the prior art combination weighing apparatus of the type discussed above, however, it often occurs that during the transportation of the articles to be weighed towards the collecting station subsequent to the weighing, one or some of the containers carrying the articles may, for example, removed or fall downward from the transport conveyor system or may be jammed in machine components of the combination weighing apparatus and, therefore, the necessity may consequently occur to remove such one or some of the containers. Once this trouble happens, the order of the containers being transported may change and the sequence of weight data supplied according to the order of successive transportation will not match with the order of the articles to be weighed that are successively transported as carried by the respective containers. For this reason, the combination calculation need be interrupted temporarily so that the weight values of the respective articles to be weighed can be put in order. Thus, with the prior art combination weighing apparatus, a trouble shooting necessitated subsequent to change of the order of transportation is complicated and time-consuming.

SUMMARY OF THE INVENTION

Accordingly, the present invention has been devised with a view to substantially eliminating the above discussed problems inherent in the prior art combination weighing apparatus and is intended to provide an improved combination weighing apparatus effective to accomplish a reliable and accurate combination calculation even though the order of transportation of the articles to be weighed changes by some reason.

To this end, a combination weighing apparatus according to the present invention comprises a plurality of containers for accommodating respective articles to be weighed and capable of being transported together with such articles to be weighed, each of said containers bearing an information storage medium on or from which product information including a weight value of the article to be weighed is recorded or read-out, respectively; a write-in means for writing the product information in the information storage medium; a read-out means for reading the product information from the information storage medium; and a calculating means for combining respective weight values of the articles to be weighed which have been read out and for selecting a combination having a weight equal or approximating to a target value within a predetermined weight allowance.

With this combination weighing apparatus of the structure described above, since the container bearing the information storage medium storing the weight value of the article to be weighed is transported together with the articles to be weighed, an accurate combination weighing can be achieved based on the weight value stored in the information storage medium even though one of the articles to be weighed is removed and/or the order of transport of the articles to be weighed changes during the transportation thereof.

Preferably, the combination weighing apparatus of the type referred to above also comprises a transport conveyor for successively transporting the containers, each bearing the information storage medium and accommodating the article to be weighed which has been weighed, towards a collecting station; a collecting conveyor for successively transporting the containers, each bearing the information storage medium and having been selected by the combination calculating means for a combination, from the collecting station: and a delivery mechanism for successively delivering the containers, each bearing the information storage medium and having been selected for the combination, from the collecting station onto the collecting conveyor. Accordingly, transportation of the articles to be weighed towards the collecting station and transportation of the articles to be weighed, which have been selected for the combination, from the collecting station can be smoothly carried out by means of the transport conveyor, the collecting conveyor and the delivery mechanism, respectively.

In a preferred embodiment of the present invention, a primary weighing machine for weighing each of the articles to be weighed which forms a main component of a combined produce, and a secondary weighing machine for weighing the articles to be weighed which form the remaining component of the combined product are employed in the combination weighing apparatus. In such case, the combination calculating means is operable to perform a calculation by combining the weight value measured by the primary weighing machine and the weight value measured by the secondary weighing machine. The information storage medium is affixed to at least one of each of first containers, each accommodating the article to be weighed which has been weighed by the primary weighing machine, and each of second containers each accommodating the article to be weighed which has been weighed by the secondary weighing machine.

According to this specific feature, the so-called parent-and-child weighing in which the weighing is carried out by adding the main component of the articles to be weighed to the remaining component thereof can be accurately performed based on the weight value stored in the information storage medium even though any trouble may occur during the transportation.

In another preferred embodiment of the present invention, the parent-and-child weighing is carried out by means of first and second weighing systems including respective transport conveyors. In other words, the first weighing system includes a first transport conveyor for successively transporting the first containers, each accommodating the article to be weighed which has been weighed by the primary weighing machine, towards a first collecting station; a transport conveyor for successively transporting the first containers, which have been selected for the combination by the combination calculating means, from the first collecting station; and a first delivery mechanism for successively delivering the first containers, which have been selected for the combination, from the first collecting station onto the transfer conveyor. On the other hand, the second weighing system includes a second transport conveyor for successively transporting the second containers, each accommodating the article to be weighed which has been weighed by the secondary weighing machine, towards a second collecting station; a collecting conveyor for successively transporting the second containers, which have been selected for the combination by the combination calculating means, from the second collecting station; and a second delivery mechanism for successively delivering the second containers, which have been selected for the combination, from the second collecting station onto the collecting conveyor. In this case, the information storage medium is affixed to at least one of each of the first containers and each of the second containers.

According to the use of the first and second weighing systems discussed above, transportation of the articles to be weighed towards the collecting station and transportation of the articles to be weighed, which have been selected for the combination, from the collecting station can be smoothly carried out by means of the first and second conveyors, the transport conveyor, the collecting conveyor and the delivery mechanism, respectively.

In a further preferred embodiment of the present invention, the transport conveyor and said collecting conveyors are disposed so as to extend parallel to each other and are positioned close to each other, and shutters are employed for temporarily gating the first and second containers so that the first container accommodating the article to be weighed and transported by the transport conveyor after selection for the combination and the second container to be combined with such first container and accommodating the article to be weighed and transported by the collecting conveyor after selection for the combination can be transported while held at respective positions close to each other.

According to this feature, since the first and second containers accommodating the articles to be weighed which have been selected for the combination are transported in a single set, a job performed by an attendant worker can be facilitated when the attendant worker has to add the articles to be weighed within the first transport container into the second container.

In a still further preferred embodiment of the present invention which involves the parent-and-child weighing, there is employed a transfer conveyor for successively transporting the second containers, which have been emptied after the article to be weighed contained in the second container on the collecting conveyor has been transferred onto the first container on the transport conveyor, towards a location adjacent an upstream end of the second transport conveyor.

The use of the transfer conveyor is effective to allow the second containers to be reused. The first containers may be shipped to the market, for example, in the form of a product package.

Also, preferably, the product information is written in the information storage medium, affixed to each of the containers being transported, by the write-in means and is read out from the information storage medium by the read-out means. The information storage medium may be a magnetic tape, an optical tag or an electromagnetic induction tag.

BRIEF DESCRIPTION OF THE DRAWINGS

In any event, the present invention will become more clearly understood from the following description of a preferred embodiment thereof when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

A preferred embodiment of the present invention will now be described with reference to the accompanying drawings.

Figure 1:
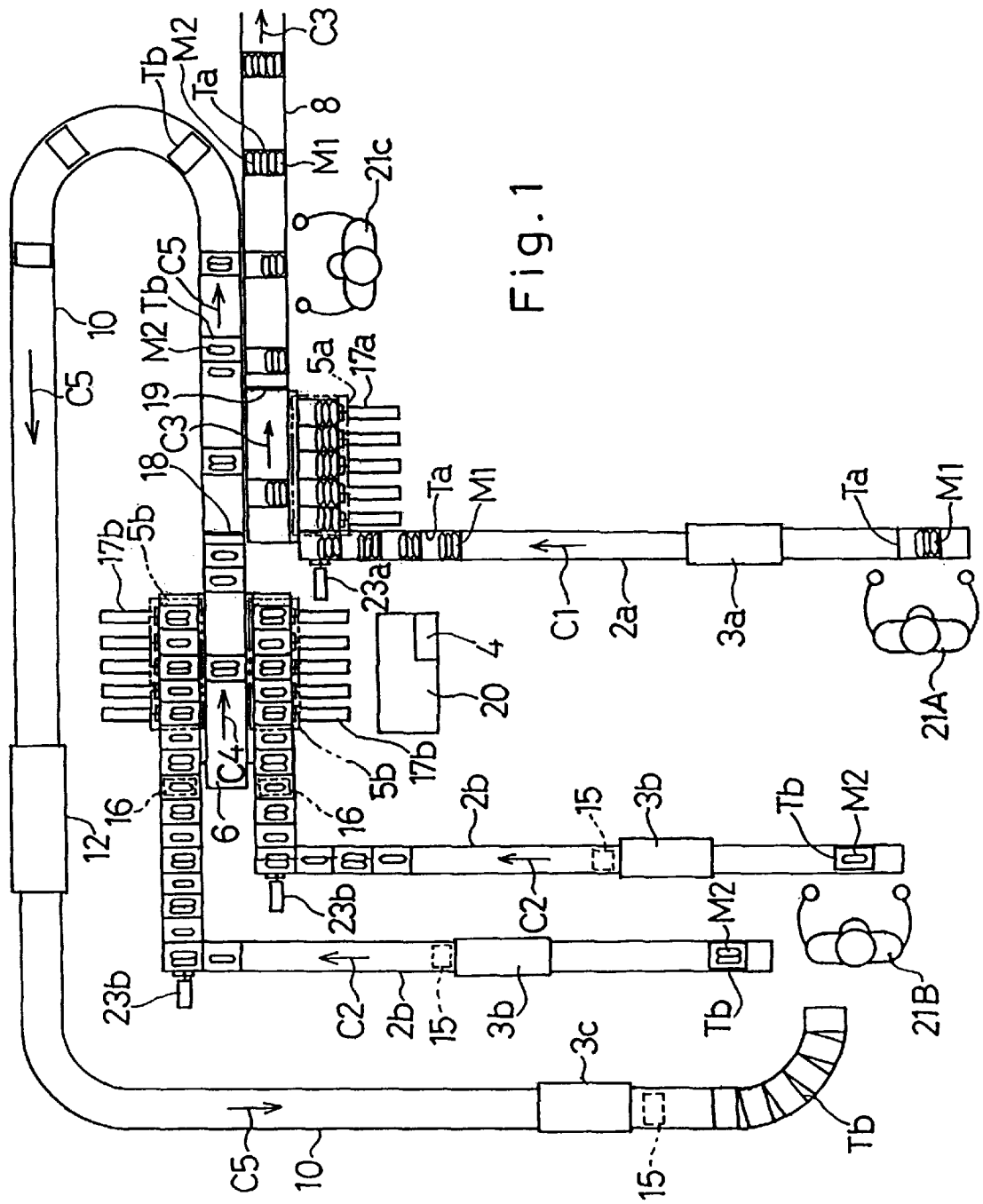
FIG. 1 is a schematic plan view showing a combination weighing apparatus according to a preferred embodiment of the present invention.

Referring first to FIG. 1, a combination weighing apparatus shown therein is of a type in which a plurality of containers each capable of carrying an article to be weighed such as, for example, a hot-seasoned cod roes and capable of being transported together with the respective article to be weighed, each of said containers bearing an information storage medium on or from which product information including the weight of the respective article to be weighed is recorded or read, respectively, are utilized and in which the articles to be weighed carried by the containers are subjected to the combination weighing to provide assorted products having a predetermined weight. With the combination weighing apparatus of the present invention, when the plural articles to be weighed are weighed, the weight of a main component of each of the articles to be weighed is primarily weighed and the remaining component of each of the articles to be weighed is secondarily weighed, the primary weight and the secondary weight being subsequently combined. The main component of each of the articles to be weighed referred to above may be, for example, one or more relatively big, well-shaped hot-seasoned cod roes whereas the remaining component thereof may be a small complete, half or fraction of the hot-seasoned cod roe.

The combination weighing apparatus comprises a first transport conveyor 2a which is provided with a primary weighing machine 3a for primarily weighing product containers (first containers) Ta each having an article to be weighed M1 received therein while such product containers Ta are successively transported and which is operable to transport successively the product containers Ta each carrying the respective article to be weighed M1, horizontally towards a first collecting station 5a in a transport direction shown by the arrow C1, and at least one second transport conveyor 2b which is provided with a secondary weighing machine 3b for secondarily weighing transport containers (second containers) Tb each having the article to be weighed M2 received therein while such transport containers Tb are successively transported and which is operable to transport successively the transport containers Tb each carrying the respective articles to be weighed M2, horizontally towards a second collecting station 5b in the transport direction C2. In the illustrated embodiment, two second transport conveyors 2b are employed and arranged so as to extend parallel to each other so that the number of the articles to be weighed which can be combined or assorted can be increased.

Figure 2:
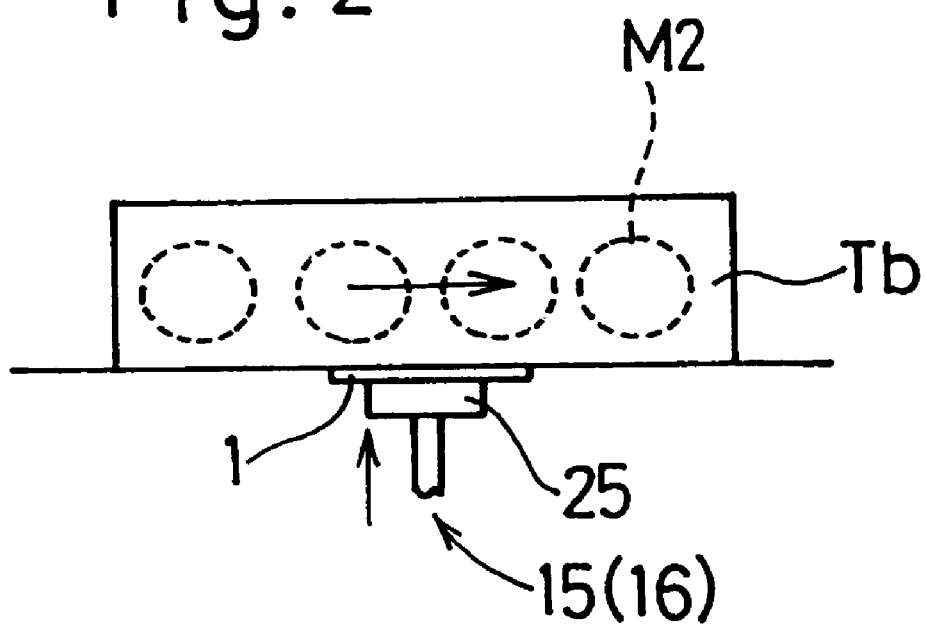
FIG. 2 is a side view showing a container having a storage medium affixed thereto.

As shown in FIG. 2, each of the transport containers Tb has a bottom to which the information storage medium 1 such as, for example, a magnetic recording tape bonded or otherwise secured. This information storage medium 1 for each of the transport containers Tb has product information recorded thereon. The product information includes a weight value of an article to be weighed. If desired, this product information may also include one or more of a designation of the kind of the article to be weighed (product code), a designation of the date of manufacture or preparation and any other particulars associated with the article to be weighed. The information storage medium 1 may alternatively be affixed exteriorly to a side face of each transport container Tb. Other than the magnetic recording tape on or from which the product information can be written or read out, respectively, by a magnetic recording and/or reproducing head (input/output head) either on a non-contact basis or in sliding contact therewith, the information storage medium may be, for example, an optical ID tag on or from which the product information can be written or read out, respectively, through an optical communication, or an electromagnetic induction ID tag capable of generating an electromotive force with which an IC circuit can be activated.

As shown in FIG. 1, the combination weighing apparatus of the present invention also comprises a combination calculating device 4 for combining the respective weight values of the articles to be weighed which have been obtained from the primary weighing machine 3a and the secondary weighing machine 3b and to subsequently select a combination of the articles which will have a weight equal or approximating to a target value within a predetermined weight allowance. This combination calculating device 4 is disposed within a controller 20 for controlling the combination weighing apparatus in its entirety.

A collecting conveyor 6 is disposed at a site between the respective second collecting stations 5b and 5b of the second transport conveyors 2b and 2b so that one or a plurality of the transport containers (containers with the information storage media thereon) Tb which has/have been selected for the combination can be transported horizontally from the second collecting stations 5b and 5b in the transport direction C4. The transport containers Tb selected for the combination are pushed by a second delivery mechanism 17b, comprised of a plurality of pushers, in a direction perpendicular to the transport direction C4 and are thus delivered from the second collecting stations 5b and 5b onto the collecting conveyor 6. Depending on the result of the combination calculation, the plural transport container Tb may be simultaneously delivered. Once the transport containers Tb are delivered onto the collecting conveyor 6, next succeeding transport containers Tb are successively pushed and thus delivered by a pusher mechanism 23b towards the second collecting station 5b.

A product transport conveyor 8 is positioned in the neighborhood of the collecting conveyor 6. This product transport conveyor 8 is operable to transport the product containers Ta, which have been selected for combination and are then delivered from the first collecting station 5a, horizontally in the transport direction C3. The product containers Ta selected for the combination are pushed by a first delivery mechanism 17a, comprised of a plurality of pushers, in a direction perpendicular to the transport direction C3 and are thus delivered from the first collecting station 5a onto the product transport conveyor 8. Once the product containers Ta are delivered onto the product transport conveyor 8, next succeeding product containers Ta are successively pushed and thus delivered by a pusher mechanism 23a towards the first collecting station 5a.

The product containers Ta are successively transported in the transport direction C3 in synchronism with a container group including one or a plurality of the transport containers Tb, which are selected for the combination and are transported by the collecting conveyor 6, that is, a container group which will be associated with a combination of the product containers Ta and, during the transportation thereof, the articles to be weighed M2 contained in the respective transport containers Tb are manually transferred onto the product containers Ta. A transfer conveyor 10 connected with a downstream end of the collecting conveyor 6 with respect to the direction of transport thereof is operable to transport successively the empty transport containers Tb, from which the articles to be weighed M2 have been transferred manually onto the product containers Ta, horizontally in a transport direction C5 towards a predetermined location adjacent respective upstream ends of the second transport conveyors 2b and 2b.

Figure 3:
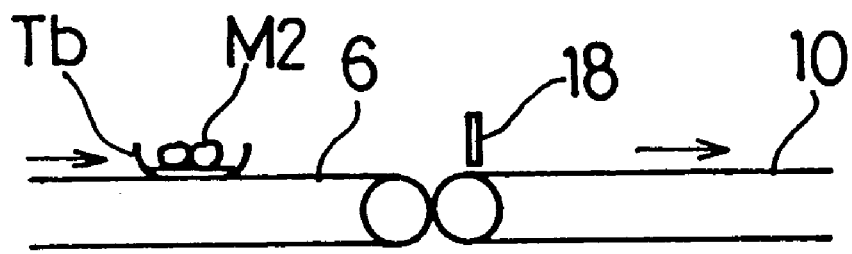
FIG. 3 is a schematic side view showing a connection between a collecting conveyor and a transport conveyor both shown in FIG. 1.

As shown in FIG. 3, a shutter 18 id disposed at a predetermined location adjacent an upstream end of the transfer conveyor 10 and, similarly, a shutter 19 is disposed at a predetermined location above the product transport conveyor 8 as shown in FIG. 1. According to the timing of selective opening and closing of those shutters 18 and 19, the articles to be weighed M1 and M2 can be temporarily gated to synchronize transportation of the transport container Tb and the product container Ta with each other so that the transport container Tb and the product container Ta can be transported in a juxtaposed fashion with each other. The transfer conveyor 10 is provided with a washing unit 12 for washing the empty transport containers Tb and a container weighing machine 3c for measuring the weight (tare) of the empty transport container Tb while the latter is being transported. In the combination weighing apparatus of the present invention, the first transport conveyor 2a, the second transport conveyor 2b, the collecting conveyor 6, the product transport conveyor 8 and the transfer conveyor 10 are all installed horizontally.

Write-in device 15 and 15 shown by the broken lines in FIG. 1 are disposed at respective locations adjacent downstream sides of the secondary weighing machine 3b and the container weighing machine 3c and immediately below the transfer conveyor 10 and the second transport conveyor 2b and positioned in the close vicinity of the transfer conveyor 10 and the second transport conveyor 2b. As shown in FIG. 2, each of the write-in device 15 and 15 includes an input/output head (R/W) 25 which may be either a contact-type that is urged upwardly by a spring force towards a contact surface where it contacts the magnetic tape 1 which is the information storage medium, or a wireless type disposed spaced some distance from the ID tag 1 which is the information storage medium. Each of the write-in device 15 and 15 is operable to write the weight value of the transport container Ta, then being transported, on the information storage device 1 affixed to the bottom of such transport container Ta through the input/output (R/W) head 25. The weight value of the empty transport container Tb is subtracted from the weight value of the transport container Tb accommodating therein the articles to be weighed M2 which has been secondarily weighed, so that the accurate weight value of the article to be weighed M2 which has been secondarily weighed can be detected.

Also, a read-out device 16 shown by the broken line in FIG. 1 is disposed at a location adjacent an upstream side of each of the second collecting stations 5b and 5b and immediately below each of the second transport conveyors 2b and 2b. The read-out device 16 includes an input/output (R/W) head 25 similar to that described above and, therefore, the weight value written in the information storage medium 1, affixed to the bottom of each of the transport containers Tb then transported successively, can be read therefrom. Also, when the weight value of the article to be weighed M2 is to be written by the write-in device 15, the kind (product code), the date of manufacture and any other desired information are simultaneously written in as desired.

It is to be noted that each of the product container Ta shown in FIG. 1 is not provided with the information storage medium capable of being recorded and read out and, therefore, neither the container weighing machine for weighing the empty product containers Ta, nor both of the write-in device 15 and the read-out device 16 are employed. Since the product containers Ta have a uniform weight value fixed thereto according to the product contained therein and, therefore, the accurate weight value can be obtained by subtracting the uniform weight value of each product container Ta from the weight value which has been primarily measured.

Hereinafter, the operation of the combination weighing apparatus of the structure discussed above will be described.

An attendant worker 21A fills, on one-by-one basis, the product containers Ta with the article to be weighed M1 and successively places the product containers Ta with the articles filled therein on the first transport conveyor 2a. The product containers Ta are, while being transported in the transport direction C1, weighed by the primary weighing machine 3a which supplies the measured weights successively to the combination calculating device 4. The weight value of the product container Ta stored beforehand is subtracted from the measured weight and to give the accurate weight value of the articles to be weighed M1 which has been primarily weighed. Thereafter, the product containers Ta are successively transported to the first collecting station 5a.

On the other hand, in the transfer conveyor 10, after the empty transport containers Tb have been washed by the washing unit 12, the weight value (tare) of each of the empty transport containers Tb is measured by the container weighing machine 3c. This weight value is written on the information storage medium 1 by means of the write-in means 15.

Another attendant worker 21B fills, on one-by-one basis, the empty transport containers Tb with the article to be weighed M2 and successively places the filled transport containers Tb with the articles therein on the second transport conveyors 2b and 2b. The filled transport containers Tb and Tb are, while being transported in the transport direction C2, weighed by the secondary weighing machines 3b and 3b. The weight values measured by the secondary weighing machines 3b and 3b are written on the information storage medium 1 by means of the write-in device 15 in a manner similar to that described above. The weight value of each of the empty transport container Tb is subtracted from this measured weight value to give the accurate weight value of the article to be weighed M2 which has been secondarily weighed.

After the weight value of the article to be weighed M2 which has been secondarily weighed has been read out by the read-out device 16, the transport containers Tb are successively transported to the second collecting station 5b. Accordingly, even though before reading one of the transport containers Tb being successively transported by the second transport conveyor 2b is removed or placed in a different order, the weight value of the article to be weighed M2 that has been delivered can be accurately and reliably read out and, therefore, an accurate combination calculation can be achieved without the combination weighing disturbed.

The weight value of the article to be weighed M1 which has been primarily weighed and the weight value of the article to be weighed M2 which has been secondarily weighed and read out by the read-out device 16 are inputted and stored in the controller 20 and are subsequently combination-calculated to eventually select a combination between the parent and the child. Once the combination has been selected, the selected product container Ta is delivered onto the product transport conveyor 8 by the first delivery mechanism 17a on the parent's side and the selected transport container Tb is delivered to the collecting conveyor 6 by the second delivery mechanism 17b on the child's side.

In this way, according to the present invention, the transport containers Tb each bearing the information storage medium 1 in which the weight value of the article to be weighed M2 is stored are successively transported by the second transport conveyor 2b together with the respective articles to be weighed M2. Accordingly, even though one of the transport containers Tb carrying the respective articles to be weighed M2 is removed or placed in a different transport order during the successive transportation thereof and since the weight value of the article to be weighed M2 which has been transported to the second collecting station 5b and the weight value of the article to be weighed M2 which is selected for the combination are matched with each other, an accurate and reliable combination weighing can be achieved based on the weight value stored in the information storage medium 1 affixed to the transport container Tb. Also, successive transportation of the articles to be weighed M2 towards the second collecting station 5b and successive transportation of the articles to be weighed M2 which have been selected for the respective combinations are smoothly accomplished by the second transport conveyor 2b, the collecting conveyor 6 and the second delivery mechanism 17b.

Thereafter, the shutter 18 is opened at such a timing that the space between each neighboring transport containers Tb on the transfer conveyor 10 attains a predetermined distance in the transport direction C5, to allow such transport containers Tb to be transferred from the collecting conveyor 6 onto the transfer conveyor 10. Then, at such a timing that the position of the transport container Tb on the transfer conveyor 10 with respect to the transport direction C5 and the position of the product container Ta on the product transport conveyor 8, which participate in the combination with such transport container Tb, with respect to the transport direction C3 align with each other, the shutter 19 is opened to allow the product container Ta to be transported. Accordingly, the containers Ta and Tb selected for the combination are transported respectively by the associated conveyors 8 and 10 while occupying the same positions with respect to the transport direction C3 or C5 in side-by-side fashion, that is, in a fashion packed in a single unit.

A further attendant worker 21C manually transfer the article to be weighed M within the transport container Tb to the product container Ta while the containers Ta and Tb are being transported. In other words, the attendant worker 21C removes the article to be weighed M2, which has been secondarily weighed, from the transport container Tb which is held at the same position as the product container Ta and then places or packs it at an empty site of the product container Ta then accommodating the article to be weighed M1 which has been primarily weighed.

Since the containers Ta and Tb accommodating the articles to be weighed M which have been selected for the combination are integrated into a single set, the attendant worker 21C can easily pack the articles to be weighed M2 within the transport container Tb into the product container Ta. Also, since the various conveyors 2a, 2b, 6, 8 and 10 are installed horizontally and are used to transport the containers Ta and Tb, accommodating therein the respective articles to be weighed M1 and M2, horizontally in synchronism with each other and, during the transportation, the article to be weighed M2 within the transport container Tb is transferred onto the product container Ta, a satisfactory combination weighing can be achieved without the product being deformed even though such product is susceptible to deformation such as found with hot-seasoned cod roes of a kind susceptible to deformation and, hence, to reduction in commercial quality.

Also, since the transport container Tb from which the article to be weighed M2 has been transferred onto the product container Ta is subsequently transported by the transfer conveyor 10 towards a predetermined location adjacent the upstream ends of the second transport conveyors 2b and 2b past the washing unit 12. Accordingly, the transport containers Tb after having been used are successively recovered for reuse and are, therefore, economical to use.

In the foregoing embodiment of the present invention, each of the transport containers Tb bears the information storage medium 1 in the form of either the magnetic tape or the ID tag. However, in a different preferred embodiment of the present invention, the information storage medium 1 may be affixed to each of the product containers Ta and in such case, the write-in device for writing the weight value in the information storage medium 1 and the read-out device 16 for reading the weight value from the information storage medium 1 are to be disposed on the first transport line 2a. In a still preferred embodiment of the present invention, the information storage medium 1 may be affixed to each of the transport containers Tb and also each of the product containers Ta.

Also, the read-out device 16 may be disposed at any required position, for example, at respective locations corresponding to the delivery mechanisms 17a or 17b associated respectively with the collecting station 5a or 5b, so that the weight of the article to be weighed M1 or M2 that is positioned ahead of the delivery mechanisms 17a or 17b can be read out. In such case, since the weight value can be read out just before selection for the combination, no problem will occur even though the order of transport of the article to be weighed M1 or M2 is changed at a location upstream thereof.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment of the present invention the article to be weighed M1 which has been primarily weighed and the article to be weighed M2 which has been secondarily weighed have been described as combined to provide the product of a predetermined weight, the present invention can be equally applied to the combination weighing apparatus wherein no primary weighing is employed and the articles to be weighed M2 which have been secondarily weighed are combined to provide the product of a predetermined weight. In such case, the article to be weighed M2 which has been secondarily weighed is manually transferred from the transport container Tb onto an empty product container.

Accordingly, such changes and modifications are, unless they depart from the scope of the present invention as delivered from the claims annexed hereto, to be construed as included therein.

What is claimed is:

1. A combination weighing apparatus for performing a combination weighing of a plurality of articles to be weighed, said apparatus comprising:

a plurality of containers for accommodating respective articles to be weighed and capable of being transported together with such articles to be weighed, each of said containers bearing an information storage medium on or from which product information including a weight value of the article to be weighed is recorded or read-out, respectively;

a write-in means for writing the product information in the information storage medium;

a read-out means for reading the product information from the information storage medium; and a calculating means for combining respective weight values of the articles to be weighed which have been read out and for selecting a combination having a weight equal or approximating to a target value within a predetermined weight allowance.

2. The combination weighing apparatus as claimed in claim 1, further comprising:

a transport conveyor for successively transporting the containers, each bearing the information storage medium and accommodating the article to be weighed which has been weighed, towards a collecting station;

a collecting conveyor for successively transporting the containers, each bearing the information storage medium and having been selected by the combination calculating means for a combination, from the collecting station: and a delivery mechanism for successively delivering the containers, each bearing the information storage medium and having been selected for the combination, from the collecting station onto the collecting conveyor.

3. The combination weighing apparatus as claimed in claim 1, further comprising:

a primary weighing machine for weighing each of the articles to be weighed which forms a main component of a combined produce, and a secondary weighing machine for weighing the articles to be weighed which form the remaining component of the combined product; and wherein said combination calculating means is operable to perform a calculation by combining the weight value measured by the primary weighing machine and the weight value measured by the secondary weighing machine; and wherein the information storage medium is affixed to at least one of each of first containers, each accommodating the article to be weighed which has been weighed by the primary weighing machine, and each of second containers each accommodating the article to be weighed which has been weighed by the secondary weighing machine.

4. The combination weighing apparatus as claimed in claim 3, further comprising:

a first transport conveyor for successively transporting the first containers, each accommodating the article to be weighed which has been weighed by the primary weighing machine, towards a first collecting station;

a transport conveyor for successively transporting the first containers, which have been selected for the combination by the combination calculating means, from the first collecting station;

a first delivery mechanism for successively delivering the first containers, which have been selected for the combination, from the first collecting station onto the transfer conveyor;

a second transport conveyor for successively transporting the second containers, each accommodating the article to be weighed which has been weighed by the secondary weighing machine, towards a second collecting station;

a collecting conveyor for successively transporting the second containers, which have been selected for the combination by the combination calculating means, from the second collecting station; and a second delivery mechanism for successively delivering the second containers, which have been selected for the combination, from the second collecting station onto the collecting conveyor; and wherein the information storage medium is affixed to at least one of each of the first containers and each of the second containers.

5. The combination weighing apparatus as claimed in claim 4, wherein said transport conveyor and said collecting conveyors are disposed so as to extend parallel to each other and are positioned close to each other, and further comprising shutters for temporarily gating the first and second containers so that the first container accommodating the article to be weighed and transported by the transport conveyor after selection for the combination and the second container to be combined with such first container and accommodating the article to be weighed and transported by the collecting conveyor after selection for the combination can be transported while held at respective positions close to each other.

6. The combination weighing apparatus as claimed in claim 4, further comprising a transfer conveyor for successively transporting the second containers, which have been emptied after the article to be weighed contained in the second container on the collecting conveyor has been transferred onto the first container on the transport conveyor, towards a location adjacent an upstream end of the second transport conveyor.

7. The combination weighing apparatus as claimed in claim 1, wherein the write-in means is operable to write the product information in the information storage medium affixed to the container being transported.

8. The combination weighing apparatus as claimed in claim 1, wherein said read-out means is operable to read the product information from the information storage medium affixed to the container being transported.

9. The combination weighing apparatus as claimed in claim 1, wherein the information storage medium is one of a magnetic tape, an optical tag and an electromagnetic induction tag.

10. A combination weighing apparatus for performing a combination weighing of a plurality of articles to be weighed, said apparatus comprising:

a plurality of containers for accommodating respective articles to be weighed and capable of being transported together with such articles to be weighed, each of said containers bearing an information storage medium on or from which product information including a weight value of the article to be weighed is recorded or read-out, respectively;

a write-in device that writes the product information in the information storage medium;

a read-out device that reads the product information from the information storage medium; and a calculator that combines respective weight values of the articles to be weighed which have been read out and selects a combination having a weight equal or approximating to a target value within a predetermined weight allowance.

11. The combination weighing apparatus as claimed in claim 10, further comprising:

a transport conveyor for successively transporting the containers, each bearing the information storage medium and accommodating the article to be weighed which has been weighed, towards a collecting station.

12. The combination weighing apparatus as claimed in claim 10, further comprising:

a transport conveyor for successively transporting the containers, each bearing the information storage medium and accommodating the article to be weighed which has been weighed, towards a collecting station;

a collecting conveyor for successively transporting the containers, each bearing the information storage medium and having been selected by the combination calculator for a combination, from the collecting station: and a delivery mechanism for successively delivering the containers, each bearing the information storage medium and having been selected for the combination, from the collecting station onto the collecting conveyor.

13. The combination weighing apparatus as claimed in claim 12, further comprising:

a primary weighing machine for weighing each of the articles to be weighed which forms a main component of a combined produce, and a secondary weighing machine for weighing the articles to be weighed which form the remaining component of the combined product; and wherein said combination calculator is operable to perform a calculation by combining the weight value measured by the primary weighing machine and the weight value measured by the secondary weighing machine; and wherein the information storage medium is affixed to at least one of each of first containers, each accommodating the article to be weighed which has been weighed by the primary weighing machine, and each of second containers each accommodating the article to be weighed which has been weighed by the secondary weighing machine.

14. The combination weighing apparatus as claimed in claim 13, further comprising:

a first transport conveyor for successively transporting the first containers, each accommodating the article to be weighed which has been weighed by the primary weighing machine, towards a first collecting station;

a transport conveyor for successively transporting the first containers, which have been selected for the combination by the combination calculator, from the first collecting station;

a first delivery mechanism for successively delivering the first containers, which have been selected for the combination, from the first collecting station onto the transfer conveyor;

a second transport conveyor for successively transporting the second containers, each accommodating the article to be weighed which has been weighed by the secondary weighing machine, towards a second collecting station;

a collecting conveyor for successively transporting the second containers, which have been selected for the combination by the combination calculator, from the second collecting station; and a second delivery mechanism for successively delivering the second containers, which have been selected for the combination, from the second collecting station onto the collecting conveyor; and wherein the information storage medium is affixed to at least one of each of the first containers and each of the second containers.

15. The combination weighing apparatus as claimed in claim 13, further comprising a transfer conveyor for successively transporting the second containers, which have been emptied after the article to be weighed contained in the second container on the collecting conveyor has been transferred onto the first container on the transport conveyor, towards a location adjacent an upstream end of the second transport conveyor.

16. The combination weighing apparatus as claimed in claim 10, wherein the write-in means is operable to write the product information in the information storage medium affixed to the container being transported.

17. The combination weighing apparatus as claimed in claim 10, wherein the write-in device is operable to write the product information in the information storage medium affixed to the container being transported.

18. The combination weighing apparatus as claimed in claim 10, wherein said read-out device is operable to read the product information from the information storage medium affixed to the container being transported.

19. The combination weighing apparatus as claimed in claim 10, wherein the information storage medium is one of a magnetic tape, an optical tag and an electromagnetic induction tag.

* * * * *